(12) United States Patent
Smith

(10) Patent No.: US 7,278,189 B2
(45) Date of Patent: Oct. 9, 2007

(54) SPRING FASTENER WITH SIDE SPACER

(76) Inventor: Michael Walter Smith, 89 Golfview Rd., Lake Zurich, IL (US) 60047

( * ) Notice: Subject to any disclaimer, the term of this patent is extended or adjusted under 35 U.S.C. 154(b) by 55 days.

(21) Appl. No.: 11/001,825

(22) Filed: Dec. 2, 2004

(65) Prior Publication Data
US 2006/0117536 A1   Jun. 8, 2006

(51) Int. Cl.
*A44B 21/00* (2006.01)
(52) U.S. Cl. ....................................................... 24/295
(58) Field of Classification Search .......... 24/293–295, 24/289, 297; 411/508, 913
See application file for complete search history.

(56) References Cited

U.S. PATENT DOCUMENTS

| | | | |
|---|---|---|---|
| 5,314,280 A * | 5/1994 | Gagliardi et al. | 411/182 |
| 5,992,914 A * | 11/1999 | Gotoh et al. | 296/39.1 |
| 6,381,811 B2 * | 5/2002 | Smith et al. | 24/289 |
| 6,928,705 B2 * | 8/2005 | Osterland et al. | 24/295 |
| 2003/0233738 A1 * | 12/2003 | Osterland et al. | 24/293 |

* cited by examiner

*Primary Examiner*—James Brittain

(57) ABSTRACT

A spring fastener characterized by a structure having a top portion and a cavity in which the rib of a first article, such as a plastic panel for example having a lower side, may be engaged, and is also suitable to be engaged reversibly in a slot of a second article, such as a metal sheet for example, like the frame of a car for example. The spring fastener also comprises engagement springs having a peak, a front end, and an engagement region between the peak and the front end. The spring fastener further comprises side spacers disposed at the top portion and being adaptable to reach the vicinity or touch the lower side of the first article. It is highly preferable that the fastener comprises barbs with inwardly bent front ends, and that the engagement regions further have a single sided ripple. The configuration of this fastener, as well as that of the assembly of the fastener with the first and second article highly improves the balance of insertion to removal ratio, the assembly stability, rigidity, and avoidance of rumbling, among numerous other advantages.

20 Claims, 3 Drawing Sheets

SPRING FASTENER WITH SIDE SPACER

FIELD OF THE INVENTION

This invention relates to spring fasteners, especially sheet metal spring fasteners, characterized by a structure having a cavity in which an extension or rib of a first part, such as a plastic panel for example, may be engaged, and they are also suitable to be engaged reversibly in a slot of second part, such as a metal sheet or the frame of a car for example. The invention also pertains to an assembly of the first and the second part as connected to each other through the fastener, as well as vehicles comprising such assemblies.

BACKGROUND OF THE INVENTION

A number of fasteners have been used in the past for securing one object on another object, as for example, securing a first article such as for example a plastic sheet, which comprises a rib, on a second article, such as a metal or other rigid plastic sheet for example having a slot. However, the fasteners of this type, which are improved by the advances of the present invention, and which are being used presently, do not accommodate adequately cases in which the rib is longer than necessary, or the first article cannot approach the second article sufficiently, so that a considerable part of the rib remains outside the spring fastener, as it will be explained in detail hereinbelow.

Recently, a fastener has been disclosed in U.S. Pat. No. 6,718,599 B2, which is incorporated herein by reference, characterized by ergonomically balanced removal to insertion force ratio. However, even in this case, the Lever/Angle pulling force is relatively low.

Examples of other state in the art fasteners are disclosed in U.S. Pat. No. 6,718,599 (Dickinson et al.), U.S. Pat. No. 6,381,811 (Smith et al.), U.S. Pat. No. 6,353,981, U.S. Pat. No. 6,203,240 B1 (Hironaka et al.), U.S. Pat. No. 6,141,837 (Wisniewski), U.S. Pat. No. 6,074,150 (Shinozaki et al.), U.S. Pat. No. 5,987,714 (Smith); U.S. Pat. No. 5,919,019 (Fisher); U.S. Pat. No. 5,887,319 (Smith), U.S. Pat. No. 5,542,158 (Gronau et al.); U.S. Pat. No. 5,422,789 (Fisher et al.), U.S. Pat. No. 5,373,611 (Murata); U.S. Pat. No. 5,314,280 (Gagliardi), U.S. Pat. No. 5,129,768 (Hoyle et al.), U.S. Pat. No. 5,095,592 (Doerfling), U.S. Pat. No. 5,092,550 (Bettini), U.S. Pat. No. 4,981,310 (Belissaire), U.S. Pat. No. 4,712,341 (Harris, Jr. et al.), U.S. Pat. No. 4,701,984 (Wyckoff), U.S. Pat. No. 4,792,475 (Bien), U.S. Pat. No. 4,683,622 (Ohelke), U.S. Pat. No. 4,609,170 (Schnabl), U.S. Pat. No. 4,595,325 (Moran et al.), U.S. Pat. No. 4,431,355 (Junemann), U.S. Pat. No. 4,245,652 (Kelly et al.), U.S. Pat. No. 4,133,246 (Small), U.S. Pat. No. 3,864,789 (Leitner), U.S. Pat. No. 3,673,643 (Kindell), U.S. Pat. No. 3,525,129 (Holton), U.S. Pat. No. 2,825,948 (Parkin), U.S. Pat. No. 2,607,971 (Bedford, Jr.), U.S. Pat. No. 2,542,883 (Tinnerman), U.S. Pat. No. 2,424,757 (F. Klump, Jr.), U.S. Pat. No. 2,329,688 (Bedford, Jr.), and U.S. Pat. No. 2,322,656 (Murphy), among others.

None of the above disclosures of the present state in the art provide side spacers of any sort.

SUMMARY OF THE INVENTION

As aforementioned, this invention relates to spring fasteners characterized by a structure having a cavity in which the rib of a first part, such as a plastic panel for example, may be engaged, and they are also suitable to be engaged reversibly in a slot of second part, such as a metal sheet or the frame of a car for example. The invention also pertains an assembly of the first and the second part as connected to each other through the fastener, as well as vehicles comprising such assemblies.

More particularly, this invention pertains a spring fastener comprising a first side and a second side opposite the first side, the first side connected to the second side thereby forming a U-shaped structure having a cavity between the first side and the second side, a bottom portion wherein the first side and the second side are connected, a top portion, the top portion comprising a first side spacer connected to the first side, and a second side spacer connected to the second side, the first side comprising a first spring, the first spring connected to the first side in the vicinity of the bottom portion, the second side comprising a second spring, the second spring connected to the second side in the vicinity of the bottom portion, each of the first and second engagement springs comprising a peak and a free end in the vicinity of the top portion.

At least one of the first side spacer and the second side spacer may comprise a plastic material, which is preferably molded integrally on the respective first and second side The at least one of the first side spacer and the second side spacer may also be an extension of the respective first and second side.

Although U-shaped structures of any sort as described above may be benefited by the side spacers according to the present invention, the preferable structures to be provided with such side spacers are described in U.S. Pat. Nos. 6,279,207, 6,691,380 B2, 6,718,599 B2, 6,353,981 B1, application Ser. Nos. 10/704,481 now U.S. Pat. No.: 6,868,588, 10/704,094 now US Publication No: 2004-0096272 A1, 10/692,828 now Publication No: US 2004-0083582 A1, and 10/942,634 now Publication No: US 2005-0105987 A1, all eight of which patents and applications are incorporated by reference herein.

DESCRIPTION OF THE DRAWING

The reader's understanding of practical implementation of preferred embodiments of the invention will be enhanced by reference to the following detailed description taken in conjunction with perusal of the drawing figures, wherein.

DETAILED DESCRIPTION OF THE INVENTION

As aforementioned, this invention relates to spring fasteners characterized by a structure having a cavity in which the rib of a first article, such as a plastic panel for example, like a pillar for example, may be engaged, preferably reversibly, and they are also suitable to be engaged, preferably reversibly, in a slot of second article, such as a metal sheet for example, like the frame of a car for example. The invention also is related to an assembly of the first article connected to the fastener, to an assembly of a second article and the fastener to a slot of the second article, an assembly of the first and the second articles connected to each other by the fastener, as well as vehicles comprising such assemblies.

Figure 1:
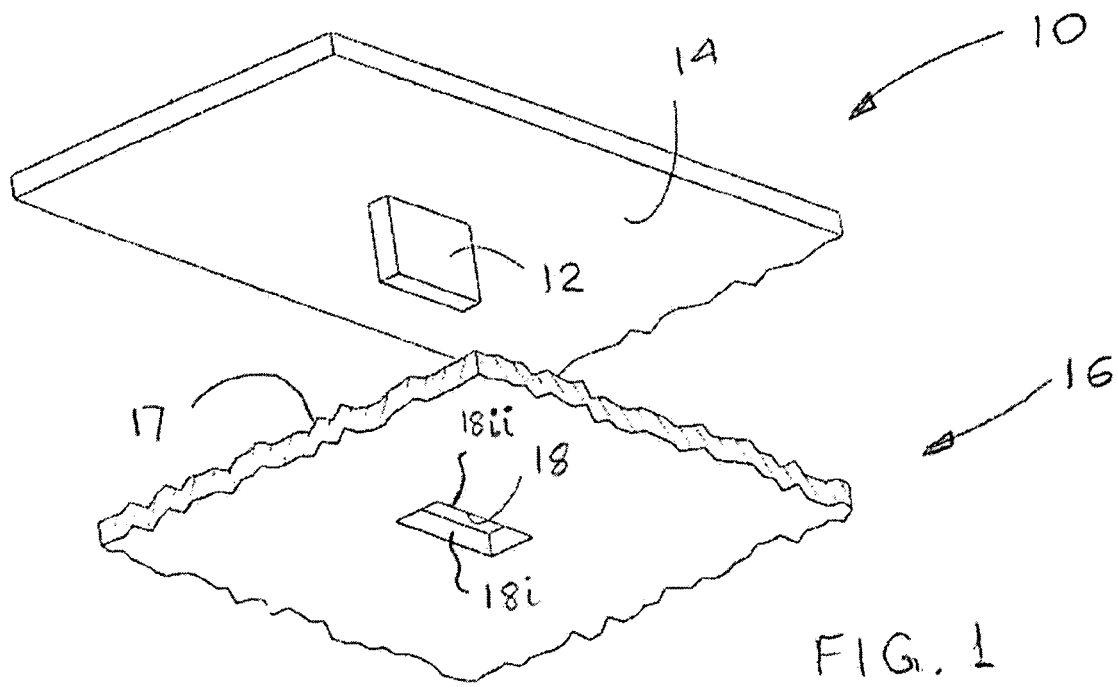
FIG. 1 illustrates a perspective view of a first article having a rib and a second article having a slot, which can be connected with the U-shaped spring fastener of the instant invention

Referring now to FIG. 1, there is depicted a first article 10, whish may be a plastic panel for example. The first article 10 comprises a rib 12, and has a lower side 14. There is also depicted a second article 16, having a slot 18, and an upper side 17. The second article 16 may be a metal sheet for example, such as a portion of the frame of a car, for example.

Figure 2:
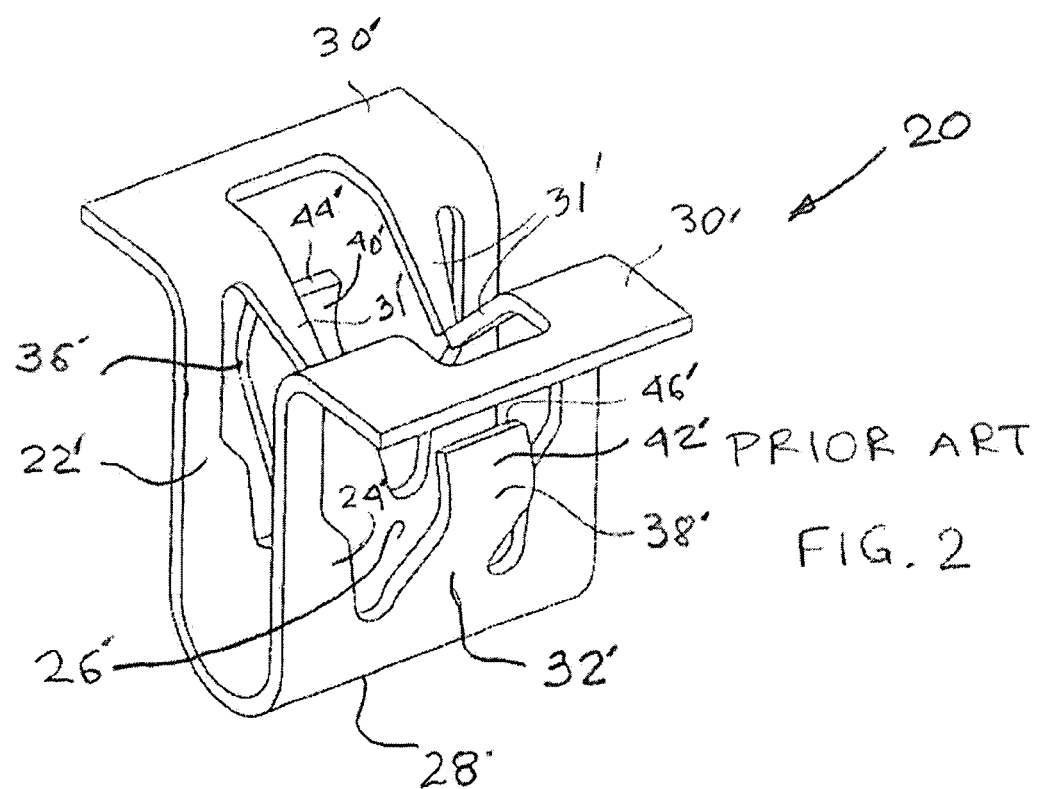
FIG. 2 illustrates a perspective view of a U-shaped spring fastener of the prior art.

When it is desired for the first article 10 to be connected to the second article 16, a U-shaped spring fastener may be used, such as the prior art fastener 20', illustrated in FIG. 2.

It should be noted that numeral with an apostrophe relevant to the prior art correspond to similar elements having no apostrophe in the structures of the present invention.

Fasteners of this type, better illustrated in FIG. 2, whether they belong to the prior art, or to the present invention, comprise a first side 22' and a second side 24' opposite the first side 22'. The first side 22' is connected to the second side 24' forming a U-shaped structure which has a cavity 26' between the first side 22' and the second side 24'. The fastener 20' also has a bottom portion 28', wherein the first side 22' and the second side 24' are connected. It further has a top portion 30'.

The first side 22' comprises a first engagement spring 32', which is connected to the first side 22' in the vicinity of the bottom portion 28'.

The second side 24' comprises a second engagement spring 34', which is connected to the second side 24', also in the vicinity of the bottom portion 28'.

Each of the first and second engagement springs 32' and 34' comprise a first and a second peak, 36' and 38', respectively, and a first and second engagement region, 40' and 42', respectively, which engagement regions end up to a first front end 44' and a second front end 46', respectively.

The two sides 22' and 24' of the fastener 20', also comprise barbs 31'.

In order to connect the first article 10 to the second article 16 through the fastener 20', the rib 12 of the first article 10 is inserted into the cavity 26' of the fastener 20', and the fastener 20' is inserted into the slot 18 of the second article 16. Depending on the application, the sequence may be different. The fastener 20' may be first inserted into the slot 18 of the second article 16, and in sequence, the rib 12 to be inserted into the cavity 26' of the fastener 20'.

Figure 5:
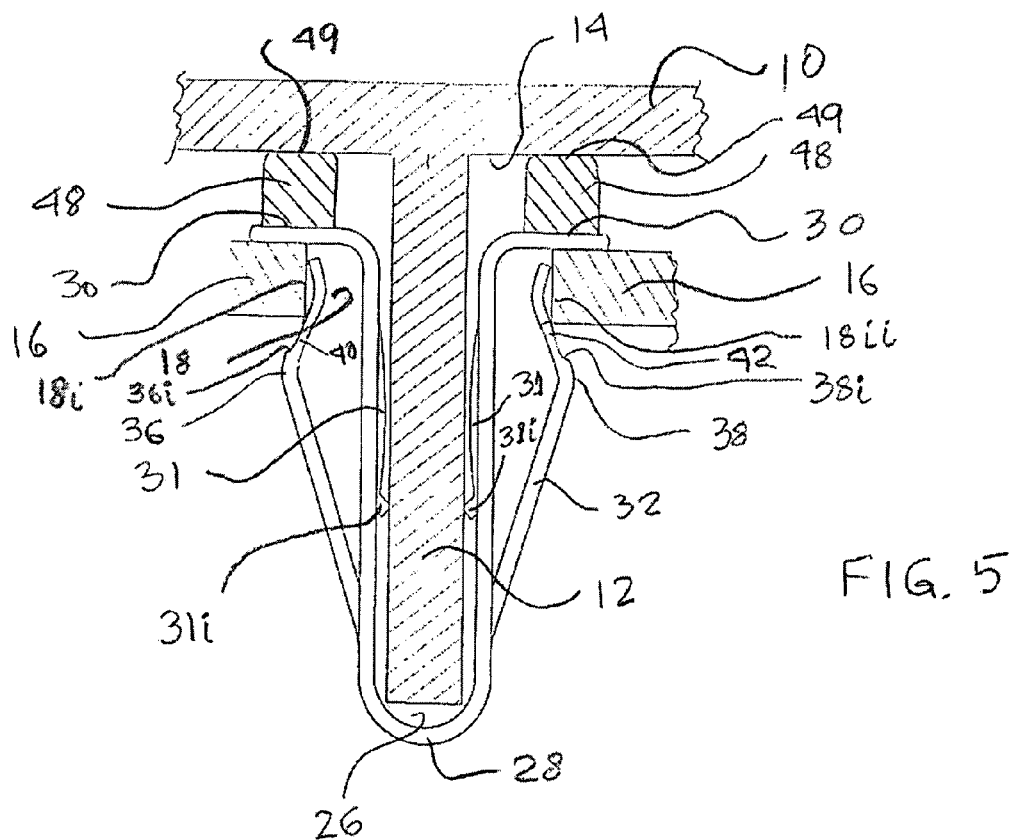
FIG. 5 illustrates a cross-sectional view of a first article comprising a rib and a second article having a slot connected with the U-shaped spring fastener of FIG. 3.
Figure 6:
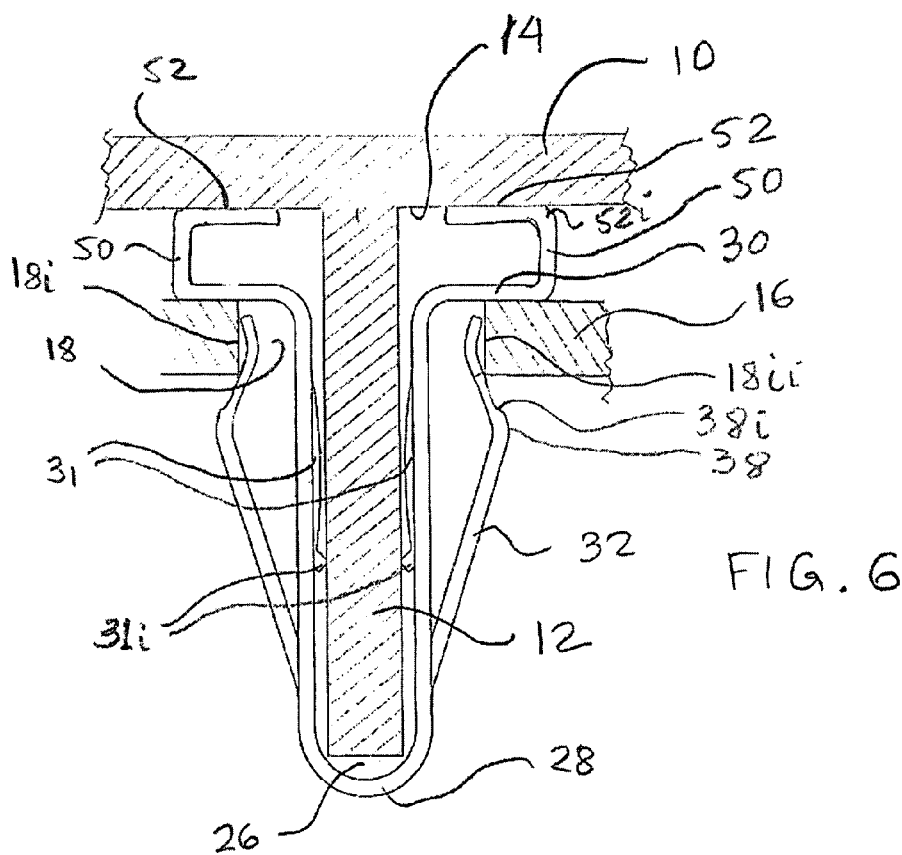
FIG. 6 illustrates a cross-sectional view of a first article comprising a rib and a second article having a slot connected with the U-shaped spring fastener of FIG. 4.

Using one of the two sequences of operation, the barbs 31' hold the rib 12 within the cavity 26' of the fastener 20', while the edges 18i and 18ii of the slot 18 push against the engagement regions 40 and 42, respectively, and hold the fastener 20' within the slot 18 of the second article 16. This operation holds the two articles 10 and 16 together by means of the fastener 20', as it is also illustrated in FIGS. 5 and 6 of the instant invention.

For many reasons, including but not limited to stability of the connection, avoidance of rambling, and rigidity of the total structure, the lower side of the first article 10 is as close as possible, and preferably touches the top portion 30 of the fastener 20' according to one embodiment.

In a number of occasions, because of engineering miscalculations, or because of necessity and/or economic reasons, or for a number of other reasons, the rib 12 is not inserted completely in the slot 18', so that the lower side 14 of the first article 10 is not close vicinity with the upper side 17 of the second article 16. In a number of other occasions, the rib 12 is too long and/or too short and the lower side 14 of the first article 10, not only does not touch the upper side 17 of the second article 16, or even the upper portion 30 of the fastener 20, but it is considerably away from them. According to one embodiment, the first side spacer 48 and the second side spacer 48 fill a gap between the first article 10 and second article 16.

Figure 3:
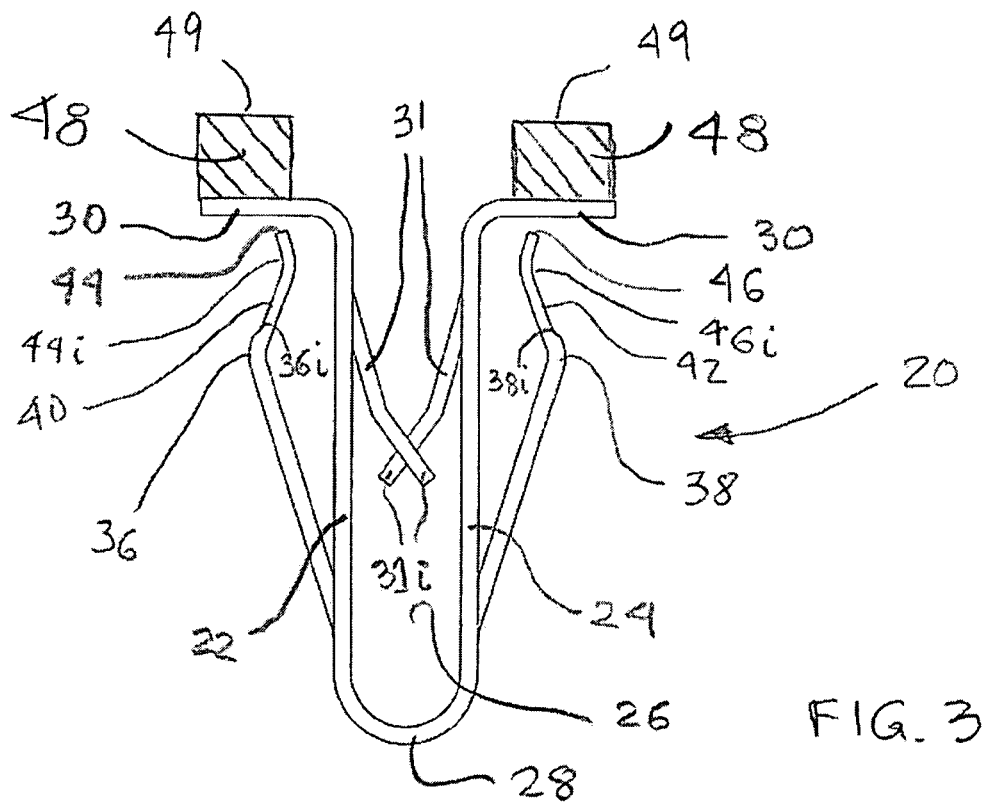
FIG. 3 illustrates a cross-sectional view of a U-shaped spring fastener according to a preferred embodiment of the present invention.
Figure 4:
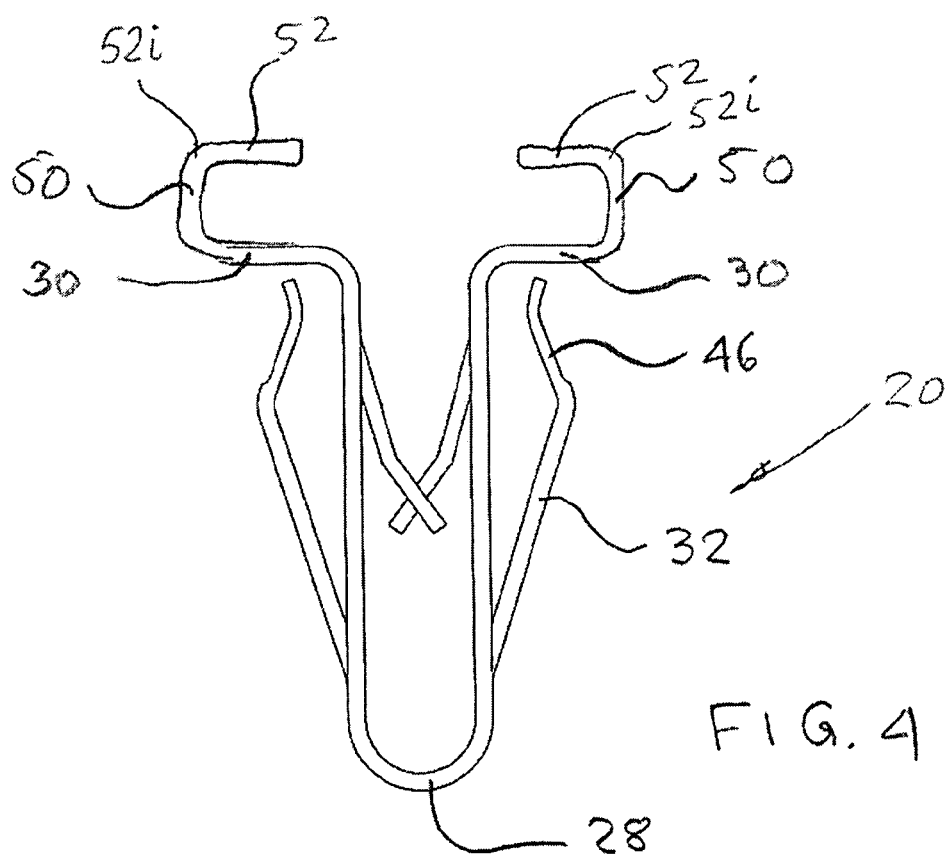
FIG. 4 illustrates a cross-sectional view of a U-shaped spring fastener according to another preferred embodiment of the present invention

The present invention corrects this problem by providing U-shaped spring fasteners 20, better illustrated in FIGS. 3 and 4, with a plastic side spacer 48 or an extension side spacer 50, as better illustrated in FIGS. 3 and 4, respectively. Of course, any other types of side spacers, integrally connected to the top portion 30, may be used in order to provide the same benefits, and are included within the scope of the instant invention. This invention encompasses both U-shaped fasteners of the prior art as well as preferred U-shaped fasteners, as long as they are provided with side spacers described herein.

The side spacers 48 (FIG. 3) may comprise plastic material, which is preferably non-elastic, or slightly elastic. Such materials are very well known to the art. The plastic side spacers 48 have an upper side 49, which is preferably substantially flat.

The side spacers 50 are just an extension of the top portion 30 of the fastener, and they preferably comprise a substantially flat upper side 52, or they may end substantially where the bent 52i is located.

Side spacers, such as 48 and 50 are mere examples, and are designed to be disposed in close vicinity, or preferably in touch, with the upper side 14 of the first article 10 according to the present invention, when the two articles 10 and 16 are connected together through the fastener 20, and thus eliminating the problems referred to hereinabove.

It should be noted that one of the side spacers (not shown) may be plastic side spacer, such as 48 for example, while the other may be extension side spacer, such as 50 for example.

The engagement regions 40 and 42 of the spring fastener 20 fastener as may further comprise respective recesses 44i and 46i in the vicinity of the top ends 44 and 46, respectively.

It is highly desirable that the engagement regions 40 and 42 comprise ripples 36i and 38i, respectively in the vicinity of the peaks 36 and 38, respectively. It is more desirable that the ripples 36i and 38i have only a single side, which even more preferably has a curvature of gradually decreasing slope.

It is also desirable that at lest one of the engagement sections 40 and 42 further comprises a side-cut section (not shown) disposed in the vicinity of the ripple 36i and/or 38i, the side-cut section (not shown) comprising an upper edge (not shown) and a lower edge (not shown), the lower edge being partially bent outwardly.

The spring fastener 20 of the instant invention may further comprise at least one barb 31 having a front end 31i, the at least one barb 31 being bent inwardly in the vicinity of the front end 31i.

In operation, in order to connect the first article 10 to the second article 16 through the fastener 20, the rib 12 of the first article 10 is inserted into the cavity 26 of the fastener 20, and the fastener 20 is inserted into the slot 18 of the second article 16. Depending on the application, the sequence may be different. The fastener 20 may be first inserted into the slot 18 of the second article 16, and in sequence, the rib 12 to be inserted into the cavity 26 of the fastener 20, as better illustrated in FIGS. 5 and 6.

Using one of the two sequences of operation, the barbs 31 hold the rib 12 very securely, due to the bent barbs, within the cavity 26 of the fastener 20, while the edges 18*i* and 18*ii* of the slot 18 push against the engagement regions 40 and 42, respectively, and hold the fastener 20 within the slot 18 of the second article 16. This operation holds the two articles 10 and 16 together by means of the fastener 20. The bent barbs provide easy insertion of the rib 12 into the cavity 26 of the fastener 20 with difficult extraction. The ripples 36*i* and 38*i* provide easy insertion of the fastener 20 into the slot 18 with difficult extraction.

The upper side 49 of the plastic side spacer 48 (FIG. 5) and the upper side 52 of the extension side spacer 50 are designed to be in the vicinity of the lower side 14 of the first article 10, and preferably being in contact with said first side 14.

This configuration provides the assembly stability, rigidity, and avoidance of rumbling, among numerous other advantages.

As aforementioned, this invention also is related to an assembly of the first article 10 connected to the fastener 20, to an assembly of a second article 16 and the fastener 20 inserted into the slot 18 of the second article 16, an assembly of the first 10 and the second articles 16 connected to each other by the fastener 20, as well as vehicles (not shown) comprising such assemblies, depicted in FIGS. 5 and 6, as well as their equivalents. Thus, according to the present invention, any embodiments of fasteners described above and their equivalents may be used in any assembly in which the first article 10 and the second article 16 are connected with the fastener 20, as well as in any vehicle comprising such an assembly or such a fastener or its equivalents.

It should also be understood that the miscellaneous embodiments and features of the instant invention may be used in any combination or by themselves in other articles or devices, where they may be needed.

Examples of embodiments demonstrating the operation of the instant invention, have been given for illustration purposes only, and should not be construed as restricting the scope or limits of this invention in any way.

What is claimed is:

1. A spring fastener comprising:
a first side and
a second side opposite the first side, the first side connected to the second side thereby forming a
U-shaped structure having a cavity between the first side and the second side,
a bottom portion wherein the first side and the second side are connected,
a top portion formed from a top potion of the first side and the second side comprising:
  a non-elastic first side spacer connected to the top potion of the first side, and
  a non-elastic second side spacer connected to the top potion of the second side, the first side comprising:
  a first spring, the first spring connected to the first side in the vicinity of the bottom portion, the second side comprising:
  a second spring, the second spring connected to the second side in the vicinity of the bottom portion.

2. A spring fastener as defined in claim 1, wherein at least one of the non-elastic first side spacer and the non-elastic second side spacer comprises a plastic material.

3. A spring fastener as defined in claim 2, wherein the at least one of the non-elastic first side spacer and the non-elastic second side spacer is integrally molded on the respective first and second side.

4. A spring fastener as defined in claim 1, wherein at least one of the non-elastic first side spacer and the second non-elastic side spacer is an extension of the respective first and second side.

5. The spring fastener of claim 1 wherein the non-elastic first side spacer has a thickness substantially greater than a thickness of the top portion of the first side and the non-elastic second side spacer has a thickness substantially greater than a thickness of the top portion of the second side.

6. The spring fastener of claim 1 wherein at least one of the first side and second side further includes at least one bend to form at least one of the: non-elastic first side spacer and the second non-elastic side spacer.

7. An assembly of a first article having a lower side, and a second article, the first and second article connected with a spring fastener, the spring fastener comprising a first side and a second side opposite the first side, the first side connected to the second side thereby forming a U-shaped structure having a cavity between the first side and the second side, a bottom portion wherein the first side and the second side are connected, a top portion, the top portion formed from a top potion of the first side and the second side comprising:
  a non-elastic first side spacer connected to the top potion of the first side, and a non-elastic second side spacer connected to the top potion of the second side, the first side comprising a first spring, the first spring connected to the first side in the vicinity of the bottom portion, the second side comprising a second spring, the second spring connected to the second side in the vicinity of the bottom portion, wherein the first side spacer and the second side spacer have an upper side, which upper side is in the vicinity or reaches the lower side of the first article.

8. An assembly as defined in claim 7, wherein at least one of the non-elastic first side spacer and the non-elastic second side spacer comprises a plastic material.

9. An assembly as defined in claim 8, wherein the at least one of the non-elastic first side spacer and the non-elastic second side spacer is integrally molded on the respective first and second side.

10. An assembly as defined in claim 7, wherein at least one of the non-elastic first side spacer and the non-elastic second side spacer is an extension of the respective first and second side.

11. The spring fastener of claim 7 wherein the non-elastic first side spacer has a thickness substantially greater than a thickness of the top portion of the first side and the non-elastic second side spacer has a thickness substantially greater than a thickness of the top portion of the second side.

12. The spring fastener of claim 7 where the non-elastic first side spacer and the non-elastic second side spacer fill a gap between the first article and second article.

13. The spring fastener of claim 7 wherein at least one of the first side and second side further includes at least one bend to form at least one of the: non-elastic first side spacer and the second non-elastic side spacer.

14. A vehicle comprising an assembly of a first article having a lower side, and a second article, the first and second article connected with a spring fastener, the spring fastener comprising a first side and a second side opposite the first side, the first side connected to the second side thereby forming a U-shaped structure having a cavity between the first side and the second side, a bottom portion wherein the first side and the second side are connected, a top portion formed from a top potion of the first side and the second side, the top portion comprising:

a non-elastic first side spacer connected to the top potion of the first side, and a non-elastic second side spacer connected to the top potion of the second side, the first side comprising:

a first spring, the first spring connected to the first side in the vicinity of the bottom portion, the second side comprising a second spring, the second spring connected to the second side in the vicinity of the bottom portion, wherein the first side spacer and the second side spacer have an upper side, which upper side is in the vicinity or reaches the lower side of the first article.

15. A vehicle as defined in claim 14, wherein at least one of the non-elastic first side spacer and the non-elastic second side spacer comprises a plastic material.

16. A vehicle as defined in claim 15, wherein the at least one of the non-elastic first side spacer and the non-elastic second side spacer is integrally molded on the respective first and second side.

17. A vehicle as defined in claim 14, wherein at least one of the non-elastic first side spacer and the non-elastic second side spacer is an extension of the respective first and second side.

18. The spring fastener of claim 14 wherein the non-elastic first side spacer has a thickness substantially greater than a thickness of the top portion of the first side and the non-elastic second side spacer has a thickness substantially greater than a thickness of the top portion of the second side.

19. The spring fastener of claim 14 where the non-elastic first side spacer and the non-elastic second side spacer fill a gap between the first article and second article.

20. The spring fastener of claim 14 wherein at least one of the first side and second side further includes at least one bend to form at least one of the: non-elastic first side spacer and the second non-elastic side spacer.

* * * * *